United States Patent [19]

Minowa et al.

[11] Patent Number: 4,873,536

[45] Date of Patent: Oct. 10, 1989

[54] METHOD AND APPARATUS FOR PREVENTING UNEVENNESS IN PRINTING DEPTH IN A THERMAL PRINTER

[75] Inventors: Takehiko Minowa; Toshifumi Yamamoto, both of Hino, Japan

[73] Assignee: Kabushiki Kaisha Toshiba, Japan

[21] Appl. No.: 136,395

[22] Filed: Dec. 22, 1987

[30] Foreign Application Priority Data

Dec. 26, 1986 [JP] Japan ............................ 61-313064

[51] Int. Cl.[4] ........................ G01D 9/00; G01D 15/10

[52] U.S. Cl. ............................ 346/76 PH; 219/216; 346/1.1

[58] Field of Search ........................ 346/1.1, 76 PH; 219/216 PH; 400/120

[56] References Cited

U.S. PATENT DOCUMENTS

| | | | |
|---|---|---|---|
| 4,376,942 | 3/1983 | Toth et al. | 400/120 X |
| 4,475,114 | 10/1984 | Koyama et al. | 346/76 PH |
| 4,524,368 | 6/1985 | Invi et al. | 346/76 PH |
| 4,532,523 | 7/1985 | Tanaka | 346/76 PH |
| 4,563,691 | 1/1986 | Noguchi et al. | 219/216 PH |
| 4,573,058 | 2/1986 | Brooks | 346/1.1 X |
| 4,590,487 | 5/1986 | Noguchi et al. | 219/216 PH X |
| 4,675,695 | 6/1987 | Samuel | 346/76 PH X |
| 4,717,924 | 1/1988 | Bangs et al. | 346/76 PH |
| 4,758,966 | 7/1988 | Brooks et al. | 364/519 |

*Primary Examiner*—J. R. Scott

*Attorney, Agent, or Firm*—Banner, Birch, McKie & Beckett

[57] ABSTRACT

The present invention provides improved method and apparatus for preventing unevenness in thermal printers. Generally unevenness in thermal printers is a result of temperature variations between the heat generating elements thereof. The present invention seeks to prevent unevenness in printing by compensating the driving current of each heat generating element in response to its temperature. The temperature of the heat generating elements is determined by driving each element to a predetermined temperature while heating and determining the time interval which elapses between heatings. Further, thermal characteristics of the printing head can be used to compensate the driving current. Lastly, the driving current can be compensated with data which represents the time interval between printing successive lines of data.

37 Claims, 5 Drawing Sheets

| NON-PRINT PERIOD | LINE OF ORIGINAL PRINT DATA | PULSE WIDTH OF EACH PRINT PULSE | 25 μs | 45 μs | 50 μs | 50 μs | 55 μs | 55 μs | 55 μs | 60 μs | 65 μs | TOTAL PULSE WIDTH |
|---|---|---|---|---|---|---|---|---|---|---|---|---|
| | | | 1st | 2nd | 3rd | 4th | 5th | 6th | 7th | 8th | 9th | |
| 1ms | 1 | 4096 th ELEMENT | 0 | 1 | 0 | 0 | 1 | 1 | 0 | 0 | 1 | 220 μs |
| ⋮ | ⋮ | | ⋮ | ⋮ | ⋮ | ⋮ | ⋮ | ⋮ | ⋮ | ⋮ | ⋮ | ⋮ |
| 2 ms | 1 | 3rd ELEMENT | 0 | 0 | 1 | 1 | 1 | 1 | 0 | 1 | 1 | 335 μs |
| 1 ms | 0 | 2nd ELEMENT | 0 | 0 | 0 | 0 | 0 | 0 | 0 | 0 | 0 | 0 μs |
| 3ms | 1 | 1st ELEMENT | 1 | 1 | 1 | 1 | 1 | 1 | 1 | 1 | 1 | 395 μs |

Fig. 5.

| NON-PRINT PERIOD (μs) | RETRIEVED (STORED) DATA | | | | | | | | | TOTAL PRINT PULSE WIDTH (μs) |
|---|---|---|---|---|---|---|---|---|---|---|
| | 1st | 2nd | 3rd | 4th | 5th | 6th | 7th | 8th | 9th | |
| 0 | FF | 00 | 00 | 00 | 00 | FF | FF | 00 | FF | 200 |
| 125 | FF | 00 | 00 | 00 | 00 | FF | FF | 00 | FF | 200 |
| 250 | FF | 00 | 00 | 00 | 00 | FF | FF | 00 | FF | 200 |
| 375 | FF | 00 | 00 | 00 | 00 | FF | FF | 00 | FF | 200 |
| 500 | FF | 00 | 00 | 00 | 00 | FF | FF | 00 | FF | 200 |
| 625 | FF | 00 | 00 | 00 | 00 | FF | FF | 00 | FF | 200 |
| 750 | FF | 00 | 00 | 00 | 00 | FF | FF | 00 | FF | 200 |
| 875 | FF | 00 | 00 | 00 | 00 | FF | FF | 00 | FF | 200 |
| 1000 | 00 | FF | 00 | 00 | FF | FF | 00 | 00 | FF | 220 |
| 1125 | FF | FF | 00 | 00 | FF | FF | 00 | FF | 00 | 240 |
| 1250 | FF | 00 | FF | 00 | FF | 00 | 00 | FF | FF | 255 |
| 1375 | 00 | 00 | FF | 00 | FF | FF | FF | FF | 00 | 275 |
| 1500 | 00 | 00 | FF | 00 | 00 | FF | FF | FF | FF | 285 |
| 1625 | FF | FF | 00 | 00 | FF | FF | FF | 00 | FF | 300 |
| 1750 | FF | 00 | 00 | 00 | FF | FF | FF | FF | FF | 315 |
| 1875 | 00 | 00 | FF | FF | FF | FF | FF | FF | 00 | 325 |
| 2000 | 00 | 00 | FF | FF | FF | FF | 00 | FF | FF | 335 |
| 2125 | FF | FF | 00 | FF | FF | FF | FF | FF | 00 | 345 |
| 2250 | FF | FF | 00 | FF | 00 | FF | FF | FF | FF | 355 |
| 2375 | FF | 00 | FF | 00 | FF | FF | FF | FF | FF | 365 |
| 2500 | 00 | FF | FF | FF | FF | FF | FF | FF | 00 | 370 |
| 2625 | 00 | FF | FF | FF | 00 | FF | FF | FF | FF | 380 |
| 2750 | 00 | 00 | FF | FF | FF | FF | FF | FF | FF | 390 |
| 2875 | FF | FF | FF | FF | FF | FF | FF | FF | 00 | 395 |
| 3000 | FF | FF | FF | FF | FF | FF | FF | FF | 00 | 395 |
| 3125 | FF | FF | FF | FF | FF | FF | FF | 00 | FF | 400 |
| 3250 | FF | FF | FF | FF | 00 | FF | FF | FF | FF | 405 |
| 3375 | FF | FF | 00 | FF | FF | FF | FF | FF | FF | 410 |
| 3500 | FF | 00 | FF | FF | FF | FF | FF | FF | FF | 415 |
| 3625 | FF | 00 | FF | FF | FF | FF | FF | FF | FF | 415 |
| 3750 | FF | 00 | FF | FF | FF | FF | FF | FF | FF | 415 |
| 3875 | FF | 00 | FF | FF | FF | FF | FF | FF | FF | 415 |
| 4000 | 00 | FF | FF | FF | FF | FF | FF | FF | FF | 435 |
| 4125 | 00 | FF | FF | FF | FF | FF | FF | FF | FF | 435 |
| 4250 | 00 | FF | FF | FF | FF | FF | FF | FF | FF | 435 |
| 4375 | 00 | FF | FF | FF | FF | FF | FF | FF | FF | 435 |
| 4500 | 00 | FF | FF | FF | FF | FF | FF | FF | FF | 435 |
| 4625 | 00 | FF | FF | FF | FF | FF | FF | FF | FF | 435 |
| 4750 | FF | FF | FF | FF | FF | FF | FF | FF | FF | 460 |
| 4875 | FF | FF | FF | FF | FF | FF | FF | FF | FF | 460 |
| 5000 | FF | FF | FF | FF | FF | FF | FF | FF | FF | 460 |

Fig. 6.

METHOD AND APPARATUS FOR PREVENTING UNEVENNESS IN PRINTING DEPTH IN A THERMAL PRINTER

BACKGROUND OF THE INVENTION

1. Field of the Invention

This invention relates to the field of thermal printing apparatus and, more particularly, to method and apparatus for preventing unevenness in printing depth in thermal printers.

2. Description of the Prior Art

Thermal printing apparatus is popularly used in facsimile receivers or other printers mainly because they are small, light, and easy to maintain. The thermal printing receivers used in facsimile apparatus and other printers have a thermal printing head which includes a line of heat generating elements, shift registers and latch circuitry. A line of data, each bit of which corresponds to each one of the heat generating elements, is supplied to the head along with a print enabling signal. Electric current flows through preselected heat generating elements, i.e., elements which receive a print signal, when the print enabling signal is active. The current receiving elements then generate heat which causes a portion of a thermosensitive recording medium in contact with the elements to darken. Lines of print data are successively supplied to the head, along with print enabling signals, until the printing operation is completed.

As with all other types of printing apparatus, there exists a need for thermal printing apparatus to print as rapidly as possible. One method for increasing the printing speed of thermal printing apparatus is to reduce the driving cycle. However, it has been noted that by shortening the driving cycle unevenness in printing depth normally occurs. Because printing the current line begins at a time when heat due to printing the previous line remains, temperature differences exist between previously heated elements and previusly non-heated elements. The previously heated elements reach each temperature level sooner than previously non-heated elements. This results in unevenness in printing depth.

Conventional methods for preventing unevenness in printing depth modulate the driving current of the heat generating elements in response to their previous print status. Typically an element which was printing in the previous line will be driven with less current than an element which did not print the previous line. These methods rely upon a constant time interval between consecutively printed lines to provide uniformity in printing depth. However, the time interval between consecutively printed lines is not constant. Therefore, these methods result in non-uniform printing depth between consecutively printed lines. Furthermore, since the time interval between consecutively printed lines is not constant, and since the temperature decay of the heat generating elements is not linear, unevenness in printing depth may occur between elements of the same line.

Also, in the above described methods there is a need to provide the printing head with a plurality of additional elements. As an example, some apparatus which implement the above described method require at least two lines of registers. Other apparatus for implementing the above methods require logic circuits, corresponding to each element, for transforming the current data in accordance with the presence or absence of previous data. Many devices for implementing the above methods use enabling signals with different active periods to modulate the driving current to the heat generating element. These types of methods require logic circuitry to select between the several enabling signals. Other devices for controlling the magnitude of electric current supplied to the heat generating elements require at least two switches for selecting either one of at least two sources of electric current, each having a different magnitude. Accordingly, the above described methods require a large number of logic circuits to modulate the current supplied to the heat generating elements.

SUMMARY OF THE INVENTION

It is, therefore, an object of the present invention to provide new thermal printing method capable of rapidly printing without unevenness in printing depth.

It is another object of the present invention to provide thermal printing apparatus capable of rapidly printing without unevenness in printing depth, which apparatus can be manufactured at low cost.

It is a further object of the present invention to provide thermal printing method and apparatus capable of compensating a thermal characteristic of a thermal head to obtain an evenness in printing depth.

According to the present invention, and in order to realize the above noted objects, a method for printing using thermal printing apparatus is provided. The thermal printing apparatus may typically include a thermal printing head and a line of heat generating elements. Thermal printers which operate in accordance with the subject method provide a line of current print data which corresponds to a line to be printed. The thermal printers also determine a non-print priod for each element, which non-print period represents the time interval which has elapsed since that element last received driving current. Thereafter, the thermal printers determine the print period of each element in response to the current print data and the determined non-print period. Lastly, the thermal printers drive the elements to print in accordance with the determined print period.

In further embodiments of the invention, the print period may be compensated by data which is related to the thermal characteristics of the thermal printing head. Such characteristics may include, but are not limited to: the electrical resistance of each element; the thermal resistance of the heat generating elements; the temperature of the thermal printing head; and/or, the specific heat of the heat generating elements.

Thermal printing apparatus according to the present invention comprises a thermal printing head including a line of heat generating elements. The thermal printing apparatus also includes means for providing a line of current print data; means for determining a non-print period for each element wherein the non-print period represents a time interval which has elapsed since the element last received driving current; means for determining a print period from the non-print period and the current print data; and, means for driving the elements in accordance with the determined print period.

BRIEF DESCRIPTION OF THE DRAWINGS

The subject matter which is regarded as the invention is particularly pointed out and distinctly claimed in the numbered paragraphs appended hereto. The invention, however, both as to organization and method practice, together with further objects and advantages thereof, may be best understood by reference to the following detailed description of the invention taken in conjunction with the drawings in which:

FIG. 5 is a chart illustrating the operational concept with respect to the embodiment of FIG. 1; and FIG. 6 is a chart illustrating the content of ROM 11 shown in FIG. 1.

DETAILED DESCRIPTION

Figure 2:
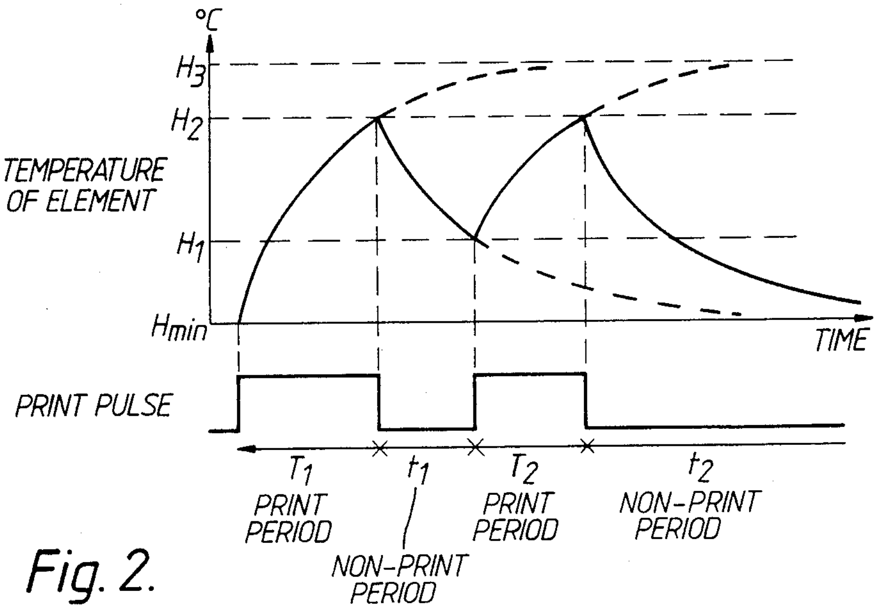
FIG. 2 is a graph illustrating the relationship between the temperature of a heat generating element and a print enabling pulse.

In accordance with the present invention, method and apparatus are provided for preventing unevenness in thermal printing depth. Generally, unevenness in printing depth is a result of temperature variations between between heat generating elements. The subject method seeks to prevent unevenness in printing depth by driving each heat generating element with just enough current to bring it to a predetermined temperature. To do this, the subject invention seeks to determine the temperature of each heat generating element, before driving current is supplied to the element, by measuring the elapsed time since that element last received driving current (referred to herein as the non-print period). A graph showing the relationship between element temperature over time for a heat generating element of a thermal printer is shown in FIG. 2. Using well known relationships between the predetermined temperature and the cooling rate of the heat generating elements, the subject apparatus can determine the temperature decay of the heat generating elements from $H_2$ to $H_{min}$ as a function of the non-print period $t_1$, $t_2$ and, thereby, provide driving current for just enough time (referred to herein as the print period $T_1$, $T_2$) to again bring the heat generating element to the predetermined temperature $H_2$.

Further, while investigating the relationship between the non-print period and the print period necessary to drive the heat generating element to the predetermined temperature additional information was revealed. It has been noted that if the non-print period t is outside of the range of 1 millisecond–5 milliseconds then the desired print period can be determined as a stepwise function of the non-print period and still effectively reduce unevenness in printing depth.

Figure 3:
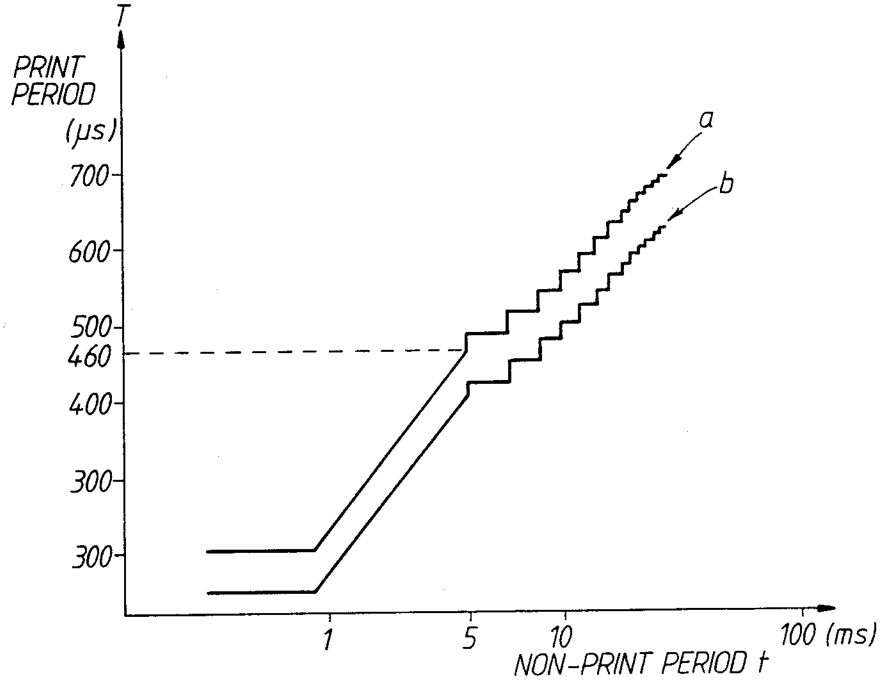
FIG. 3 is a graph illustrating the relationship between a non-print period and a print period.
Figure 4:
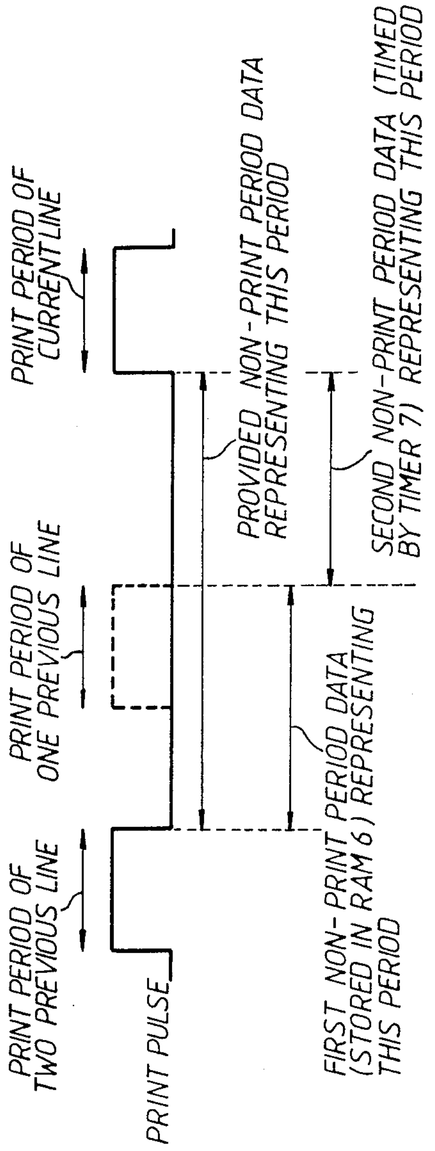
FIG. 4 is a graph illustrating the concept of a non-print period and a print period.

As shown in FIG. 3, for non-print periods less than about 1 millisecond the print period should preferably be about 200 microseconds. For non-print periods greater than about 1 millisecond and less than about 5 milliseconds, the print period should preferably be determined as a linear function of the non-print period. For non-print periods greater than about 5 milliseconds, the print period can be determined as a stepwise function of the non-print period, i.e., a single print period is provided for non-print periods within a given range. It must be noted that the horizontal axis (labeled non-print period of FIG. 3 is not a linear plot of time but instead is more of a logarithmic plot.

Referring again to FIG. 3, curve a shows the preferred relationship between non-print period and print period to prevent unevenness in printing depth when the temperature of the printing head is approximately 25 degrees centrigrade (25° C.) and the average value of resistance of the heat generating elements is 2300 ohms. The curve b shows the preferred relationship between the non-print period and the print period when the temperature of the printing head is 25° C. and the average value of resistance of the heat generating elements is 2001 ohms (2300 ohms ×0.087). For each value of non-print period, the print period T of curve b is less than the print period T of curve a. Hence, if the average value of resistance decreases, then shorter print periods will be provided for each non-print period. Further, if the temperature of the thermal head decreases, then a longer print period will be selected for each non-print period. Accordingly, the print period T may be determined by these factors, in addition to being determined by the non-print period, as will be discussed more fully below.

Figure 1:
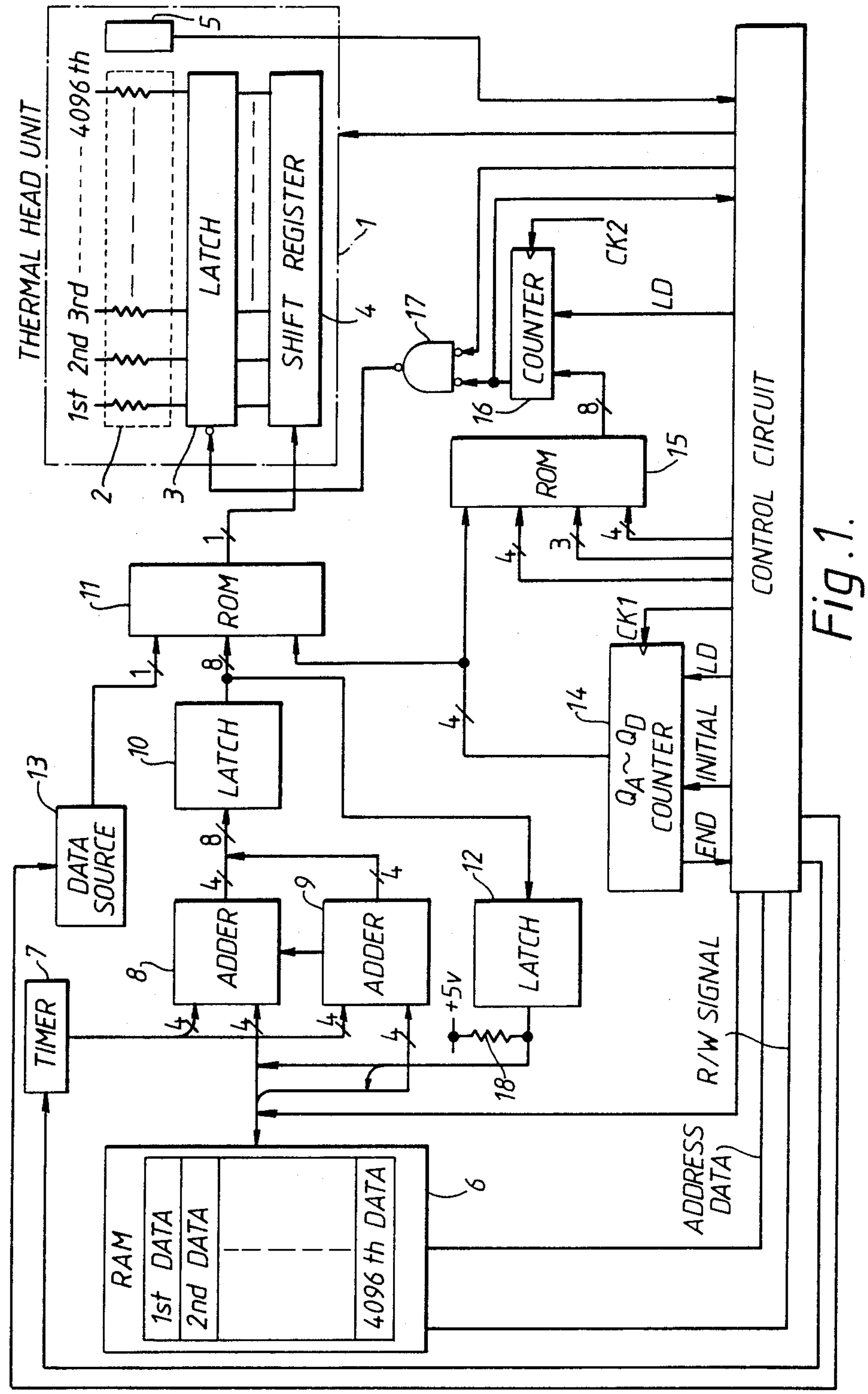
FIG. 1 is a functional block diagram illustrating an embodiment of the present invention.

Referring to FIG. 1, there is shown a functional block diagram of the present invention. Numerals located above cross marks in lines connecting block components thereof indicate the number of bit lines which may comprise each line. A thermal printer shown in FIG. 1, includes a thermal head unit 1. Head unit 1 includes a line of 4096 heat generating elements 2 each adapted to be in contact with a thermosensitive printing medium for thermal printing as is known in the art. Heat generating elements 2 are coupled to receive data from a shift register 4 via latch circuitry 3. Latch circuitry 3 is responsive to a print enabling pulse received from an AND gate 17 for driving elements 2 in accordance with a line of print data received from shift register 4. Each of the foregoing components are typically mounted on a printed circuit board installed in a metallic case. Head unit 1 further includes thermosensitive sensor 5 for detecting the temperature of thermal head unit 1. Sensor 5 may be mounted on the metallic case or any other convenient place for detecting the temperature of thermal head unit 1.

In the presently preferred embodiment, the duration of the print period is modulated by providing a plurality of print enabling pulses to latch circuitry 3 while printing each line (L) of data. Accordingly, nine print enabling pulses, each having a predetermined duration, are provided to latch circuitry 3 such that each element 2 may receive driving current for a print period having a duration equal to the duration of any combination of the nine pulses. In order to select the print enabling pulses for each element 2, a line of print data is provided to shift register 4 nine times, one for each print enabling pulse. Latch circuitry 3 stores each line of print data and drives each element 2 for the corresponding print enabling pulse in response to the stored line of print data. The manner in which the print data is supplied to register 4 will be described more fully below.

In one embodiment of the invention, the pulse widths of the nine print enabling pulses are 25, 45, 50, 50, 55, 55, 55, 60 and 65 microseconds, respectively, for a total possible pulse width of 460 microseconds. This combination of pulse widths is provided when the temperature of head unit 1 is approximately 25° C. and the average value of resistance of elements 2 is 2300 ohms. The value of the pulse widths, and hence the maximum print period, will vary with variations in average resistance and temperature as described herein.

The thermal printer of the present invention also includes a data source 13 for receiving the incoming data from a data transmitter (not shown). Data source 13 may comprise a modulation and/or demodulation unit (MODEM) as is known in the art for communicating with other thermal printing units via the telephone system or for communicating with a scanning device to read facsimile input. Data source 13 is adapted to provide data to a read only memory unit (ROM) 11 in a serial manner. ROM 11 may comprise any memory device known in the art which is capable of performing the storage functions described herein.

A timer 7 is provided for determining the time interval between successive print periods. Timer 7 includes a counter for counting the time interval and a latch circuit for storing the counted data. The counter is reset after each line is printed, i.e., after the last print enabling pulse is supplied to latch 3. Timer 7 stores two values for each printed line: (1) a first time interval corresponding to the elapsed time from the last print enabling pulse of line $L_{n-1}$ until the first print enabling pulse of line $L_n$; and, (2) a second time interval corresponding to the elapsed time from the last print enabling pulse of line $L_{n-1}$ to the last print enabling pulse of line $L_n$.

A random access memory (RAM) unit 6 stores a first non-print period for each of the plurality of heat generating elements 2. It is noted, however, that if the element 2 received driving current while printing the previous line $L_{n-1}$, then its first non-print period is zero. Accordingly, the stored non-print period data corresponding to the lement 2 is erased and is to be '00000000' data.

Adders 8 and 9 are provided for adding the value of the first non-print period retrieved from RAM 6 to the value of the first and second time intervals received from timer 7. Adder 8 adds each upper four data bits of the retrieved data and the counted data and adder 9 adds each lower four data bits of the retrieved data. It will be apparent to those skilled in the art that combining the first non-print period with the first time interval provides a non-print period just prior to printing line $L_n$ while combining the first non-print period with the second time interval provides a non-print period just after printing line $L_n$.

A latch circuit 10 is provided for storing the data bits from adders 8 and 9. Latch 10 is adapted to provide the added data to ROM 11 and latch circuit 12. The data bits provided to ROM 11 are used to access ROM 11 as address data. These data bits represent the non-print period just prior to printing line $L_n$. After printing each line $L_n$, data in RAM 6 is updated by the second time interval via adders 8 and 9 and provided to latch circuit 12 for storage in RAM 6. The line then printed $L_n$ becomes the previous printed line $L_{n-1}$. As such, the first non-print period since the printing operation began until the completion of printing the previous line $L_{n-1}$.

ROM 11 comprises a lookup table for providing print data to shift register 4 in response to input received from latch circuit 10, data source 13 and counter 14. Data source 13 provides a line of original print data to ROM 11 as a portion of the address data. The line of original print data has 4096 data bits corresponding to each element 2 and indicates whether that element is to be heated while printing the current line $L_n$. Also, each line of original print data from data source 13 is provided nine times because ROM 11 provides nine lines of print data to head unit 1 in synchronism with each print enabling pulse, in order to print one line as described above. Counter 14 provides a print time data to ROM 11, as a portion of the address data. The print time data represents the number of print enabling pulses which have been provided to latch 3. Counter 14 also generates an end of signal after counting nine print enabling pulses. ROM 11 is coupled to shift register 4 in a manner to provide the line of print data to shift register 4 nine times in repsonse to address data. The address data comprises the print time data from counter 14, the original print data from data source 13 and the non-print period data from latch circuit 10.

FIG. 6 illustrates the contents within ROM 11. The illustration shows a look-up table when the original print data bit instructs the element to print (when the original print instructs the element not to print, the print data provided to register 4 for each print enabling pulse likewise instructs the element not to print). According to FIG. 6, the stored data are 00 or FF wherein 00 corresponds to a no print signal and FF corresponds to a print signal. For example, when the added data (non-print period data) of third element 2 represents 2,000 microseconds, the original print data bit of third element 2 is '1' data and the print time data represents the first print enabling pulse, 00 is retrieved and the element receives driving current for the first print enabling pulse. Since one output terminal of ROM 11 is coupled to shift register 4, '0' is used for the first print data bit of third element 2 and is provided to shift register 4 as its print data bit. Also, when the print time data represents the ninth print, FF is retrieved and '1' data used for the ninth print of third element 2 is provided as its print data bit. If the total pulse widths of nine print enabling pulses are 460 microseconds as shown in FIG. 5, the third element 2 is driven at third, fourth, fifth, sixth, eighth and ninth print, and the total print period of the third element 2 is to be 335 microseconds.

Control circuit 20 comprises logic circuitry adapted to control the operation of the thermal printing head by providing appropriate control signals as will be described more fully below. Control circuit 20 is adapted to receive a print request from data source 13 (connection not shown) to initiate the thermal printing operation. It will be apparent to those skilled in the art that control circuit 20 may comprise any circuitry for performing the following operations. As an example, control circuit 20 may comprise a microcomputer, a logic array or other similar circuitry.

ROM 15 also comprises a lookup table which is coupled to counter 14 and control circuit 20 to obtain address data therefrom, and adapted to provide pulse width data to counter 16 to determine the pulse width of the print enabling pulses in response to the obtained address data. ROM 15 provides the different data to counter 16 nine times to produce nine print enabling pulses as shown in FIG. 5. The address data comprises the print time data from counter 14 and compensation data from control circuit 20. The compensation data is maintained constant while the nine print enabling pulses are being provided to latch 3. The compensation data comprises temperature data representing the temperature of head unit 1, predetermined resistance data representing the average value of resistance of elements 2 and interval data representing a period between the end of printing the previous line $L_{n-1}$ and the beginning of printing the current line $L_n$. The resistance data is determined during manufacturing and represents the average values of resistance of elements 2. As described above, as the average value of resistance of elements 2 increases, it is desirable to increase th duration of the print enabling pulses. Accordingly, the resistance compensation is used in this manner.

The temperature data is determined by control circuit 20 according to the output of temperature sensor 5. As also discussed above, it is desirable to increase the duration of the print enabling pulses as the temperature decreases. Hence, the retrieved pulse width data represents a narrow pulse width when the temperature data represents high temperature and the retrieved data represents a wide pulse width when the temperature data represents low temperature.

The interval data is determined by control circuit 20 and comprises four data bits. When the interval between printing successive lines is more than 5 milliseconds then the duration of the print enabling pulses is increased. The interval data is the same data when the period between the end of print of one previous line and the beginning of print of the current line is less than 5 milliseconds.

Counter 16 may comprise a modulo X counter for counting a predetermined number of clock pulses before providing an output pulse. The number of clock pulses to be counted is determined by the pulse width data received from ROM 15. Counter 16 responds to a load signal LD from control circuit 20 to count a clock signsl CK2 from a clock source (not shown). The output signal of counter 16 is active when counter 16 receives the pulse width data and the output signal is inactive after counter 16 counts a number of clock pulses CK2 as determined by the pulse width data from ROM 15. Counter 16 provides the pulse signal to latch circuitry 3, via AND gate 17, as the print enabling pulse.

A description of the operation from the view of the whole embodiment is as follows. When control circuit 20 receives the print request from data source 13, it initializes the circuit. First control circuit 20 causes RAM 6 to store data representing a long non-print period (more than 5 ms) because 5 ms has passed from last print of one previous page. This data storing operation is well knwon in the art. Then control circuit 20 sends a control signal to timer 7 to store the timer data in the latch circuit of timer 7. Control circuit 20 also sends the initial data representing the first print of nine prints and the signals LD to counter 14. Counter 14 provides the print time data representing the first print in response to the initial data and the signal LD.

After the circuit is initialized, control circuit 20 activates the enable signal and sends the first address data, corresponding to the first heat generating element. RAM 6 provides the first non-print period data to adders 8 and 9 in response to the address data. Adders 8 and 9 add the first non-print period data to the first time interval provided from timer 7 as discussed above. Adders 8 and 9 provide the added data to latch circuit 10 as the non-print period data. Initially, the added data is '$FF_H$' data because the first non-print period data retrieved from RAM 6 is '$FF_H$' data. Control circuit 20 then causes data source 13 to output the first data bit of the first line of the original print data. ROM 11 repsonds to the first data bit, the non-print period data from latch circuit 10 and the print time data from counter 14, and retrieves the stored data. The, control circuit 20 causes data source 13 to output the second data bit of the first line of original print data. Control circuit 20 also generates the second address data corresponding to the second heat generating element.Counter 14 continues to provide the same print time data. ROM 11 retrieves the next stored data in response to its input and one data bit of the retrieved data is supplied to shift register 4 as a second print data bit. This operation is repeated until the final data bit (4096th data bit) is supplied to shift register 4. The line of print data stored in shift register 4 is then transferred to latch circuit 3 by a control signal from control circuit 20.

since control circuit 20 provides the compensation data to ROM 15 when receiving the print request from data source 13, ROM 15 retrieves the appropriate pulse width data in response to the compensation data and the print time data from counter 14. The compensation data continues to be supplied until nine print enabling pulses have been completed to print one line. Control circuit 20 provides the load signal LD to counter 16 after the line of print data is transferred to latch circuit 3. Counter 16 causes the output signal to be active and begins to count the clock signal CK2. When counter 16 counts the number of clock pulses as determined by the output of ROM 15, it causes the output signal to be inactive. Since the active signal is supplied to gate 17, the first print enabling pulse is supplied to latch circuitry 3. Each element 2 is driven in accordance with its corresponding print data bit for a time interval determined by the duration of the print enabling pulse.

Control circuit 20 sends the clock signal CK1 to counter 14 when it determines the output signal from counter 16 is to be inactive. Counter 14 counts one up in response to the signal CK1 and provides the print time data representing the second of the nine print enabling pulses. Then control circuit 20 sends the first address data again and causes data source 13 to output the first data bit of first line of original print data again. Thereafter, the same operation described above is repeated for the second of the nine print enabling pulses. This process is repeated until all nine of the print enabling pulses have been provided to latch 3 thereby printing the first line of data.

After the first line has been printed, control circuit 20 sends a step signal to a motor (not shown) to transport a recording paper a little distance. Then control circuit 20 causes RAM 6 store new first non-print period data as discussed above. At first, control circuit 20 sends the control signal to timer 7 to store the timer data in the latch circuit of timer 7. The timer data represents the time interval between the ends of print of one previous line and the current line. Next, control circuit 20 determines whether each element 2 is driven by the line of original print data from data source 13. If control circuit 20 determines that element 2 is driven, it provides the address data corresponding to the determined element 2 and '$00_H$' data to RAM 6. RAM 6 stores the '$00_H$' data in corresponding address location as new first non-print period data. In this situation, control circuit 20 sends R/W signal indicating the write mode to RAM 6. The stored '$00_H$' data represents a period from last print is 0 ms. If control circuit 20 determines that element 2 is not driven, it provides the address data corresponding to the determined element 2 and R/W signal indicating the read mode to RAM 6. RAM 6 retrieves the corresponding first non-print period data in response to the address data and R/W signal. Adders 8 and 9 add the retrieved data and the timer data from the latch circuit of timer 7, and provides the added data to latch circuit 12 through latch circuit 10. Latch circuit 12 stores the added data and provides the stored data to RAM 6 as new first non-print period data. Then control circuit 20 sends R/W signal indicating the write mode to RAM 6. Since the same address data is supplied, RAM 6 stores the data from latch circuit 12 in corresponding address location in stead of the data stored until now. Thus, new first non-print period data corresponding to each element 2 is stored in RAM 6. After this storing operation is accomplished, control circuit 20 sends the control signal to timer 7 to clear the timer data. Timer 7 clears the timer data and begins to count from beginning again.

When control circuit 20 receives the print request of next line from data source 13, it carries out the same operation to print the second line. Generally, control circuit 20 receives the print request of each line at random timing in facsimile receivers so that each line of facsimile signal is transmitted to the facsimile receiver at random timing and the necessary time to demodulate and decode the facsimile signal is variable.

In the preferred embodiment, the timer data of timer 7 is cleared after the new first non-print period data is stored in RAM 6 because the storing operation is carried out a short time interval. However, the timer data may be cleared before the new first non-print period data is stored. In this case, the data stored in the latch circuit of timer 7 is not cleared such that it is available to adders 8 and 9.

Further, in the above-described embodiment, nine print enabling pulses are supplied to latch circuitry 3 to print one line. It will be apparent, however, to those skilled in the art that any number of print enabling pulses may be supplied.

While the invention has been described herein by reference to the preferred embodiment, various modifications can be made without departing from the true scope and spirit of the invention. It is our intention, therefore, by the appended claims, to embody all such modifications.

We claim:

1. In thermal printing apparatus having a thermal printing head with a line of heat generating elements, a printing method comprising the steps of:

(a) providing a line of original print data;

(b) determining an elapsed time interval for each element since that element last received driving current;

(c) determining a print period for each element in response to the original print data and a corresponding non-print period dependent upon the determined elapsed time interval; and (d) driving each element to print by the respective determined print period.

2. The method of claim 1 further comprising the step of:

compensating the respective determined print period using compensation data wherein the compensation data is related to at least one thermal characteristic of the thermal printing head.

3. The method of claim 2 wherein the compensation data comprises the average value of electrical resistance of the heat generating elements.

4. The method of claim 2 wherein the compensation data comprises temperature data related to the temperature of the thermal printing head.

5. the method of claim 4 further comprising the step of determining the temperature data during a printing cycle by sensing the temperature of the thermal printing head.

6. The method of claim 5 wherein the temperature data is determined before each line of data is printed.

7. The method of claim 2 wherein the compensation data is time interval data that represents a period between printing of adjacent lines.

8. The method of claim 7 wherein the time interval data is timed between an end of print of one previous line and a beginning of print of current line.

9. The method of claim 1 wherein step (d), driving each element comprises the substeps of:

(e) providing a plurality of print enabling pulses, each having a predetermined duration:

(f) selecting a combination of print enabling pulses such that the total duration of the selected pulses is equal to the determined print period; and (g) driving the elements with the selected pulses.

10. The method of claim 9 wherein the plurality of print enabling pulses comprises pulses having at least two different pulse durations.

11. The method of claim 9 further comprising the step of:

(g) compensating the respective pulse widths of the print enabling pulses using compensation data wherein the compensation data is related to at least one thermal characteristic of the thermal printing head.

12. The method of claim 11 wherein the compensation data comprises the average value of electrical resistance of the heat generating elements.

13. The method of claim 11 wherein the compensation data comprises temperature data related to the temperature of the thermal printing head.

14. The method of claim 13 further comprising the step of determining the temperature of the thermal printing head during a printing cycle.

15. The method of claim 14 wherein the temperature is determined before each line is printed.

16. The method of claim 9 further comprising the step of:

(h) compensating the respective pulse widths of print enabling pulses using compensation data wherein the compensation data is related to the time interval between printing adjacent lines.

17. The method of claim 16 wherein the time interval data is timed between an end of print of one previous line and a beginning of print of current line.

18. Thermal printing apparatus having a thermal printing head with a line of heat generating elements, said elements being adapted to print by receiving driving current, said thermal printing apparatus comprising:

data providing means for providing a line of original print data corresponding to a line $L_n$ to be printed wherein each line of data comprises a plurality of data bits each data bit corresponding to a respective heat generating element;

print period means for determining a non-print period for each element wherein the non-print period represents the elapsed time interval since that element last received driving current, said print period means for determining print period for each element in response to that element's respective non-print period and print data bit; and drive means for supplying driving current to each said heat generating element in response to the determined print period for said heat generating element.

19. The apparatus of claim 18 wherein said print period means comprises:

memory means for storing a first non-print period value for each said heat generating element wherein the first non-print period represents the elapsed time interval since the subject heat generating element last received driving current until the end of printing the previous line $L_{n-1}$;

timer means for determining first and second time intervals, said first time interval representing the elapsed time since the previous line $L_{n-1}$ finished printing until the current line $L_n$ began printing, said second time interval representing the elapsed time since the previous line $L_{n-1}$ finished printing until the present line $L_n$ finished printing; and means for adding the first non-print period data to the first time interval to obtain the non-print period data, said adding means for adding the first non-print period data to the second time interval to obtain a new value for the first non-print period.

20. the apparatus of claim 19 wherein said print period means further comprises:

means for erasing a first non-print period value if the corresponding element received driving current while printing the current line $L_n$.

21. The apparatus of claim 18 wherein said print period means comprises:

look-up table means for storing the print period data with respect to every element, said look-up table means for providing the appropriate print period data for each element in response to original print data and a non-print period.

22. The apparatus of claim 18 further comprising:

compensation means for compensating the respective determined print period by compensation data wherein the compensation data is related to at least one thermal characteristic of said thermal printing head.

23. The apparatus of claim 22 wherein the compensation data is the average value of electrical resistance of said heat generating elements.

24. The apparatus of claim 22 wherein the compensation data comprises temperature data related to the temperature of said thermal printing head.

25. The apparatus of claim 24 further comprising sensor means for determining the temperature of said thermal printing head during a printing cycle.

26. The apparatus of claim 25 wherein said sensor means determines the temperature of said thermal printing head before each line is printed.

27. The apparatus of claim 22 wherein the compensation data is time interval data that represents a period between printing adjacent lines.

28. the apparatus of claim 18 further comprising:

compensation means for compensating the respective determined print period using compensation data wherein the compensation data is related to the time interval between the end of printing the previous line and the beginning of printing the current line.

29. The apparatus of claim 18 wherein said print period means comprises:

pulse generating means for generating a plurality of print enabling pulses to provide to said thermal printing head successively; and selecting means for selecting any combination of the plurality of print enabling pulses for driving said heat generating elements, said drive means being responsive to said selecting means for driving said heat generating elements in accordance with the selected print enabling pulses.

30. The apparatus of claim 29 wherein said pulse generating means provides the plurality of print enabling pulses with at least two kinds of pulse widths.

31. The apparatus of claim 29 further comprising compensation means for compensating the pulse widths of the plurality of print enabling pulses using compensation data wherein the compensation data is related to at least one thermal characteristic of said thermal printing head.

32. The apparatus of claim 31 wherein said compensation means compensates the plurality of print enabling pulses with data representing the average value of electrical resistance of said elements.

33. The apparatus of claim 31 wherein said compensation means compensates the plurality of print enabling pulses with data representing the the temperature of said thermal printing head.

34. The apparatus of claim 33 further comprising sensor means for determining the temperature of said thermal head during a printing cycle.

35. The apparatus of claim 34 wherein said sensor means determines the temperature of said thermal printing head before printing each line.

36. The apparatus of claim 29 further comprising compensation means for compensating the pulse widths of the plurality of print enabling pulses using compensation data wherein the compensation data is related to the time interval between printing successive lines of data.

37. The apparatus of claim 36 wherein the time interval data is timed between an end of print of one previous line and a beginning of print of current line.

* * * * *